Patented Apr. 10, 1923.

1,451,331

UNITED STATES PATENT OFFICE.

HENRY DREYFUS, OF LONDON, ENGLAND.

MANUFACTURE OF CELLULOSE DERIVATIVES.

No Drawing.  Application filed August 5, 1920. Serial No. 401,385.

*To all whom it may concern:*

Be it known that I, HENRY DREYFUS, a citizen of the Swiss Republic, of London, England, have invented certain new and useful Improvements in or Relating to the Manufacture of Cellulose Derivatives, of which the following is a specification.

In my British application No. 21661 of 1919 dated 3rd September 1919 and U. S. application S. No. 401,383 filed Aug. 5, 1920, I have described a process for the manufacture of derivatives of cellulose, characterized by the introduction into the hydroxyl groups of cellulose or cellulose bodies, of one, two or more benzyl groups or homologues thereof in the nucleus or side chain, such for example as methyl benzyl groups, phenylethyl groups corresponding to side chain chlorethyl benzenes ($C_6H_5.CH_2.CH_2.Cl$ or $C_6H_5CH\ Cl.CH_3$), or substitution groups of any of the benzyl or homologous groups, in the nucleus, such as methoxy benzyl groups; or groups derived from xylenes or their substitution products or homologues, for example using as agents xylene derivatives in which one hydrogen atom of each or any methyl group or groups is replaced by chlorine atoms; or different members of any of the above groups. Any of such groups as aforesaid are hereinafter referred to as aralkyl groups.

In the present invention I have found that it is possible to make "mixed" cellulose derivatives containing one or more of the groups referred to in my said British specification No. 21661 of 1919 and corresponding U. S. application Ser. No. 401,-383 and one or more alkyl groups, such as ethyl or methyl or their homologues.

The present invention consists in producing "mixed" ethers of cellulose by introducing such different groups as aforesaid into the hydroxyl groups of cellulose or cellulosic bodies.

As starting material for the process it is preferred to use cellulose or near conversion products thereof, preferably as little depolymerised as possible. In particular, cellulose or cellulose conversion products insoluble in alkali are employed.

In carrying out the invention I treat the cellulose or conversion product in presence of caustic alkali or other suitable basic substances, partly with benzyl chloride or other derivatives such as referred to in my said British specification 21661 of 1919 and corresponding U. S. application Ser. No. 401,-383, hereinafter referred to as aralkyl derivatives, and partly with ethyl or methyl derivatives or their homologues hereinafter referred to as alkyl derivatives, so as to fix on the same cellulose molecule these two different kinds of groups.

The execution of the process with basic substances, such as caustic alkali or any other suitable base, may take place in such manner that the cellulose or conversion product is impregnated with alkali preferably in a concentrated form and afterwards treated according to one of the following combinations:—afterwards treated with benzyl chloride alternately or together with diethyl sulphate or dimethyl sulphate or their equivalents or homologues.

It it understood that the bodies mentioned can be replaced by their homologues or substitution products or by bodies having similar effects according to the groups to be introduced into the cellulose body.

For carrying out the process, only a restricted quantity of water, or even no water, is preferably introduced or employed in the reaction for introducing the replacing groups, as it is found that the yield and quality of the products are detrimentally affected by the presence of much water.

In carrying out the invention, the quantity of water present, whether contained in or added to the cellulose or conversion product before the reaction or added during the reaction (but disregarding water which may be formed in the reaction itself) should at no stage of the reaction be greater than from about the natural humidity content of the cellulose or cellulose conversion product, up to about 200%, or in any case not greater than about 400% relatively to the weight of the cellulose or conversion product (taken as about 100%) and preferably not in greater amount than 100% to 150% relatively to the weight of the cellulose or conversion product. One may go below 50%, for example to about the ordinary humidity content of the cellulose, and add the alkali in a powdered state and grind it with the cellulose or conversion product; it is however, less advantageous to go below about 50% water content.

It is understood that the restricted quantities of water before mentioned may be present in or introduced into the cellulose or conversion product prior to the reaction or may be introduced partly or entirely during the reaction. By way of illustration, the cellulose having the desired amount of water above indicated contained in it or introduced into it, the alkali may be added in powdered form for example; or one may start with a more or less, concentrated solution of alkali in water corresponding to the above indicated limits of water quantity. Or one may start with an alkaline solution and impregnate the cellulose with this solution, under such conditions that the amount of water will correspond before or during the reaction to the above stated limits of water content. Thus, for example, the cellulose may be impregnated with a 50% alkali solution and pressed out afterwards to such an extent that say about 100% of water remains in it (relatively to the weight of the cellulose taken as 100%), and a corresponding quantity of alkali, whilst the rest of the alkali is added in powdered form before or during the reaction. Or any other concentration of alkaline solution may be adopted and the water content be brought down within the above limits by pressing out or hydro-extracting or any other means for removing humidity, the rest of the alkali being added all at once, either continuously or at intervals in different stages.

It is to be understood, however, that the relationship between the quantity of alkali employed and the quantity of water or humidity shall be such as would correspond to a solution of about 75% to 95% or more of alkali hydroxide in the above stated limits of water quantity, and in any case to a solution of not less than about 50% if the total alkali employed were dissolved in solid or other form in such a quantity of water, that is to say the total alkali used is at least equal in weight to the weight of water present or added as mentioned, and preferably exceeds the same in a ratio of from 3:1 to 19:1 or more. This indication is of course only given as a guide to the total quantities of water and alkali employed in the process, as it is understood that during the reaction the alkali content decreases in proportion as the reaction with the replacing bodies proceeds, and that the alkali may be added all at once before the reaction or in portions at different stages of the reaction or continuously during the reaction as before mentioned.

As one example of the manner in which the invention may be carried out the following may serve—

Cellulose or a near conversion product thereof not soluble in alkali is impregnated with a concentrated caustic soda solution, e. g., of about 50% strength, so that about 4 molecular equivalents of caustic soda are contained in its relatively to one molecular equivalent of cellulose $C_6H_{10}O_5$. The cellulose is then kneaded with 2 molecules of benzyl chloride and afterwards with one molecule of diethyl sulphate.

The reaction with benzyl chloride is executed at a temperature between about 50° and 100° C. and the reaction with diethyl sulphate at about 50° C. or lower or ordinary temperature. After about two to four hours six further molecular equivalents of caustic soda are added in the form of powder and the mass is kneaded with a further three molecules of benzyl chloride at between 50° and 150° C. and afterwards with another 2 molecules of diethyl sulphate at about 50° C. or lower. After this addition, another 6 molecules of powdered caustic soda are kneaded in and then another 3 molecules of diethyl sulphate.

The so-obtained product is worked up according to any suitable method.

Instead of working in the above way, the cellulose or cellulose conversion product may be impregnated with water, e. g., 100%-400%, but preferably not more than 50%-100% on the weight of the cellulose, and the alkali be added in powdered form the procedure otherwise being similar to that just described and the product being also similar.

According to the quantity of each body used, one can introduce more or less benzyl groups or more or less ethyl groups.

The particular methods described are only given by way of illustration and can be varied within wide limits without departing from the spirit of the invention.

The whole of the alkali may be added prior to the treatment with the aralkylating or alkylating agents, these terms being understood in the broad sense hereinbefore indicated.

The aralkylating or alkylating agents, or their mixtures, may be incorporated or added all at once or in portions or interruptedly or continuously during the process.

The reaction may be carried out with or without employment of higher or lower boiling diluents or solvents not themselves liable to undergo etherification, such for example as benzol. Such liquids allow the operation to be conducted more easily, from a mechanical point of view, as they render the mass more easy to knead and assist the homogeneous distribution of the etherifying agents throughout the mass. The benzol or other such liquid may be used in any suitable proportion, for example in a quantity about equal to that of the etherifying agents.

When benzyl chloride or analogous replacing agents are used, the reaction may be carried out in the presence of copper powder, copper salts or hydroxides or any other suitable contact substance which facilitates the exchange of the halogen, Instead of caustic soda, caustic potash or other alkali may be used.

According to the quantities of aralkylating and alkylating agents used, one, two or more of such respective replacing groups may be introduced into the cellulose.

The new cellulosic derivatives obtained according to the invention may be applied or employed for all applications where cellulose esters or ethers might be used, as for example celluloid-like masses, cinematographic, photographic or other films, artificial filaments, electric insulating materials, coating solutions, varnishes and any other applications, in combination or not with any known or suitable solvents, plastifying agents or other substances. Any known or suitable methods may be applied, as for example mixing the new derivatives with solvents or plastifying bodies of high boiling point and solvents of low boiling point for making films or celluloid, or with solvents of either or both classes for making solutions, dopes; varnishes, artificial filaments and so on. Any suitable machines or apparatus may be employed, for example such as usual for making nitro- or acetylcellulose films and celluloid, artificial filaments and so forth.

What I claim and desire to secure by Letters Patent is:

1. Process for the manufacture of cellulosic derivatives being "mixed" aralkyl-alkyl ethers of cellulose, comprising treatment of a cellulosic body in presence of a base with aralkylating agents and with alkylating agents whereby aralkyl and alkyl groups are introduced into hydroxyl groups of the cellulosic body.

2. Process for the manufacture of cellulosic derivatives being "mixed" aralkyl-alkyl ethers of cellulose, comprising treatment of a cellulosic body not soluble in alkali, in presence of alkali, with aralkylating agent and with alkylating agents, whereby aralkyl and alkyl groups are introduced into hydroxyl groups of the cellulosic body.

3. Process for the manufacture of "mixed" ethers of cellulose, comprising treating a cellulosic body not soluble in alkali, in presence of alkali, with an aralkylating agent and an alkylating agent, while restricting the water present, disregarding that formed in the reaction itself, to an amount not greater than from about the natural humidity content of the cellulosic body up to about four times the weight of the cellulosic body, the total alkali used in the process being at least equal in weight to said restricted quantity of water, disregarding water formed in the reaction.

4. Process for the manufacture of "mixed" ethers of cellulose, comprising treating a cellulosic body not soluble in alkali, in presence of alkali with an aralkylating agent and an alkylating agent, while restricting the water present, disregarding that formed in the reaction itself, to an amount not greater than from about the natural humidity content of the cellulosic body up to about one and a half times the weight of the cellulosic body, the total alkali used in the process being at least equal in weight to said restricted quantity of water, disregarding water formed in the reaction.

5. Process for the manufacture of "mixed" ethers of cellulose, comprising treating a cellulosic body not soluble in alkali, in presence of alkali, with an aralkylating agent and with an alkylating agent, while restricting the water present, disregarding that formed in the reaction itself, to an amount not greater than from about the natural humidity content of the cellulosic body, up to about one-half the weight of the cellulosic body, the total alkali used in the process exceeding in a ratio of from 3:1 and upwards, the weight of said restricted quantity of water, disregarding water formed in the reaction.

6. Process for the manufacture of "mixed" ethers of cellulose, comprising treating a cellulosic body not soluble in alkali, in presence of alkali, with an aralkylating agent and with an alkylating agent, while restricting the water present, disregarding that formed in the reaction itself, to an amount not greater than from about the natural humidity content of the cellulosic body, up to about one-half the weight of the cellulosic body, the total alkali used in the process exceeding, in a ratio of from 3:1 to 19:1, the weight of said restricted quantity of water, disregarding water formed in the reaction.

7. Process for the manufacture of "mixed" ethers of cellulose, comprising treating a cellulosic body not soluble in alkali, in presence of alkali, with aralkyl halide and with dialkyl sulphate, while restricting the water present, disregarding that formed in the reaction itself, to an amount not greater than from about the natural humidity content of the cellulosic body up to one and a half times the weight of the cellulosic body, the total alkali used in the process exceeding, in a ratio of 3:1 and upwards, the weight of said restricted quantity of water, disregarding water formed in the reaction.

8. Process for the manufacture of "mixed" ethers of cellulose, comprising treating a cellulosic body not soluble in alkali, in presence of alkali, with an aralkylating agent and with an alkylating agent, while restricting the water present, disregarding that formed in the reaction itself, to an amount not greater than from about the natural humidity content of the cellulosic body up to about four times the weight of the cellulosic body, the total alkali used in the process exceeding, in a ratio of from 3:1 to 19:1, the weight of said restricted quantity of water, disregarding water formed in the reaction.

9. Process for the manufacture of "mixed" ethers of cellulose, comprising treating a cellulosic body not soluble in alkali, in presence of alkali, with aralkyl halide and with dialkyl sulphate, while restricting the water present disregarding that formed in the reaction itself, to an amount not greater than from about the natural humidity content of the cellulosic body up to about four times the weight of the cellulosic body, the total alkali used in the process being at least equal in weight to said restricted quantity of water, disregarding water formed in the reaction.

10. Process for the manufacture of "mixed" ethers of cellulose, comprising treating a cellulosic body not soluble in alkali, in presence of alkali, with aralkyl halide and with dialkyl sulphate, while restricting the water present, disregarding that formed in the reaction itself, to an amount not greater than from about the natural humidity content of the cellulosic body up to about one and a half times the weight of the cellulosic body, the total alkali used in the process exceeding, in a ratio of from 3:1 to 19:1, the weight of said restricted quantity of water, disregarding water formed in the reaction.

11. Process for the manufacture of "mixed" ethers of cellulose, comprising treating a cellulosic body not soluble in alkali with benzyl halide and with an alkylating agent, while restricting the water present, disregarding that formed in the reaction itself, to an amount not greater than from about the natural humidity content of the cellulosic body up to about four times the weight of the cellulosic body, the total alkali used in the process being at least equal in weight to said restricted quantity of water, disregarding water formed in the reaction.

12. Process for the manufacture of "mixed" cellulose ethers, comprising treating a cellulosic body not soluble in alkali, in presence of alkali, with benzyl chloride and with an ethylating agent, while restricting the water present, disregarding that formed in the reaction itself, to an amount not greater than from about the natural humidity content of the cellulosic body up to about one and a half times the weight of the cellulosic body, the total alkali used in the process exceeding, in a ratio of from 3:1 to 19:1, the weight of said restricted quantity of water, disregarding water formed in the reaction.

13. Process for the manufacture of "mixed" ethers of cellulose, comprising impregnating with alkali a cellulosic body not soluble in alkali, and thereafter treating it in presence of further alkali with an aralkylating agent and with an alkylating agent, said further alkali being added in solid form.

14. Process for the manufacture of "mixed" ethers of cellulose, comprising impregnating with alkali a cellulosic body not soluble in alkali, and thereafter treating the cellulosic body in presence of further alkali with an aralkylating agent and with an alkylating agent, said further alkali being added in solid form, the water used in the reaction, disregarding that formed in the reaction, being restricted to an amount not greater than about four times the weight of the cellulosic body, and the total alkali used in the process being at least equal in weight to said restricted quantity of water, disregarding water formed in the reaction.

15. Process for the manufacture of "mixed" ethers of cellulose, comprising impregnating with alkali a cellulosic body, not soluble in alkali, and thereafter etherifying the cellulosic body with an aralkyl halide and with an alkylating agent, in presence of further alkali, the further alkali being added by stages in solid form, and the said etherifying agents also being added by stages, the water used in the reaction, disregarding that formed in the reaction, being restricted to an amount not greater than about one and a half times the weight of the cellulosic body, and the total alkali used in the process being at least equal in weight to said restricted quantity of water, disregarding water formed in the reaction.

16. Process for the manufacture of "mixed" ethers of cellulose, comprising impregnating with alkali a cellulosic body not soluble in alkali, and thereafter etherifying the cellulosic body with benzyl chloride in presence of further alkali and with diethyl sulphate in presence of further alkali, the further alkali being added by stages in solid form and the said etherifying agents being also added by stages, the water used in the reaction, disregarding that formed in the reaction, being restricted to an amount not greater than about one and a half times the weight of the cellulosic body, and the total alkali used in the process being at least equal in weight to said restricted quantity of water, disregarding water formed in the reaction.

17. Process for the manufacture of "mixed" ethers of cellulose, comprising impregnating with alkali a cellulosic body, not soluble in alkali, and thereafter treating the cellulosic body with an aralkylating agent in presence of further alkali, and with an alkylating agent in presence of further alkali, said further alkali being added in solid form, the water used in the reaction, desregarding that formed in the reaction, being restricted to an amount not greater than from about the natural humidity content of the cellulose up to about four times the weight of the cellulosic body, and the total alkali used in the process exceeding, in a ratio of from 3:1 and upwards, the weight of said restricted quantity of water, disregarding water formed in the reaction.

18. Process for the manufacture of "mixed" ethers of cellulose, comprising treating a cellulosic body not soluble in alkali in presence of alkali with an aralkylating agent and an alkylating agent while restricting the water present, disregarding that formed in the reaction itself, to an amount not greater than from about the natural humidity content of the cellulosic body up to about four times the weight of the cellulosic body, the total alkali used in the process being at least equal in weight to the said restricted quantity of water, disregarding water formed in the reaction, the etherification being performed in the presence of a diluent not liable to be etherified by the etherifying agents.

19. Process for the manufacture of "mixed" ethers of cellulose, comprising treating a cellulosic body not soluble in alkali, in presence of alkali, with an aralkylating agent and with an alkylating agent, while restricting the water present, disregarding that formed in the reaction itself, to an amount not greater than from about the natural humidity content of the cellulosic body up to about four times the weight of the cellulosic body, the total alkali used in the process, exceeding, in a ratio of from 3 to 1 and upwards, the weight of said restricted quantity of water, disregarding water formed in the reaction, the etherification being performed in the presence of a diluent not etherifiable by the etherifying agents.

20. Process for the manufacture of "mixed" ethers of cellulose, comprising treating a cellulosic body not soluble in alkali, in presence of alkali, with aralkyl halide in presence of a contact substance favoring exchange of halogen, and with an alkylating agent, while restricting the water present, disregarding that formed in the reaction itself, to an amount not greater than from about the natural humidity content of the cellulosic body up to about four times the weight of the cellulosic body, the total alkali used in the process being at least equal in weight to said restricted quantity of water, disregarding water formed in the reaction.

21. As new products, "mixed" aralkyl-alkyl ethers of cellulose, being cellulosic derivatives wherein hydroxyl hydrogen of the cellulose is substituted by aralkyl and alkyl.

22. As new products, benzyl-ethyl "mixed" ethers of cellulose.

In testimony whereof I have hereunto subscribed my name.

HENRY DREYFUS.